United States Patent [19]

Conway

[11] Patent Number: 5,580,093
[45] Date of Patent: Dec. 3, 1996

[54] LIGHT GENERATING AND EMITTING ROLLER SKATE WHEEL

[75] Inventor: Pervis Conway, 3214 S. State St., Lockport, Ill. 60441

[73] Assignee: Pervis Conway, Lockport, Ill.

[21] Appl. No.: 543,278

[22] Filed: Oct. 16, 1995

[51] Int. Cl.$^6$ ................................................. A63C 17/26
[52] U.S. Cl. .................... 280/816; 301/5.3; 362/78; 362/192
[58] Field of Search .............................. 310/67 R, 67 A, 310/73, 154, 264; 362/72, 78, 103, 192; 280/809, 811, 816, 11.22; 301/5.3

[56] References Cited

U.S. PATENT DOCUMENTS

| | | | |
|---|---|---|---|
| 1,333,119 | 3/1920 | Krag-Moller | 362/192 X |
| 4,191,988 | 3/1980 | Kumakura | 362/72 |
| 4,298,910 | 11/1981 | Price | 280/809 X |
| 4,363,502 | 12/1982 | Bakerman | 280/816 |
| 4,782,431 | 11/1988 | Park | 362/192 X |
| 5,294,188 | 3/1994 | Vancil, Jr. | 362/78 X |
| 5,390,941 | 2/1995 | Pozzobon et al. | 280/811 X |
| 5,475,572 | 12/1995 | Tseng | 362/78 |

*Primary Examiner*—Brian L. Johnson
*Assistant Examiner*—Michael Mar
*Attorney, Agent, or Firm*—Hill, Steadman & Simpson

[57] ABSTRACT

The improved light generating and emitting roller skate wheel assembly of the present invention includes a wheel axle assembly carried by and beneath the roller skate blade. Such wheel axle assembly includes wheel bearings which are disposed thereon. A wheel hub is mounted on the wheel axle assembly and supported by the wheel bearings for rotational movement relative thereto. A tire, preferably made of a clear polymer is disposed about the wheel hub assembly. The roller skate wheel carries a light emitting mechanism, such as a light emitting diode, for emitting visible light preferably through the clear, polyurethane elastomer tires, as used in certain preferred embodiments. The roller skate wheel carries an electrical light generator which is electrically connected to the light emitting diode or other light emitting mechanism for providing electric energy and for generating light therefrom. The details of these structures are described in greater detail hereinbelow.

15 Claims, 3 Drawing Sheets

LIGHT GENERATING AND EMITTING ROLLER SKATE WHEEL

BACKGROUND OF THE INVENTION

The present invention relates to electromagnetic devices in particular, and in particular to an electromagnetic roller skate wheel including a generator for generating light to be emitted therefrom during skating.

Electrical machines including generators have been utilized by those skilled in the art for various purposes, some including very large generators, and others involving somewhat smaller generators. The general principles of an electrical generator are well known to those skilled in the electrical generating art, but such principles have not in general been applied to the roller skate arts, or certain other sports devices involving generation by the user of electrical current as a result of the sports activity. The general concept of electrical machines and generators in general is set forth in the *Electrical Engineering Handbook*, Editor in Chief, Richard C. Dorf (C.R.C. Press, Copyright 1973) at Chapter 61, Section 61.1, pages 1321–1333, the teaching of which is incorporated herein by reference.

In the prior art, various forms of roller skate wheels have been proposed and used, most recently popularized in the form of in-line roller skates. Roller skating has been generally considered to be a daytime sport; however, due to school time scheduling and other reasons, some children and adults have sought to extend the period for roller skating into the dusk and even evening hours. Lack of visibility of the person is always a difficulty in regard to dusk and evening sports activities.

In light of the potential safety hazard existing when roller skating is carried out in the dusk and/or evening hours, it is a material object of the improved light generating and emitting roller skate wheel of the present invention to reduce dangers associated with lack of visibility of the roller skater.

Other objects and advantages of the improved light generating and light emitting roller skate wheel assembly of the present invention will become apparent to those skilled in the art upon review of the following summary of the invention, brief description of the drawing, detailed description of preferred embodiments, appended claims and accompanying drawing.

SUMMARY OF THE INVENTION

The improved light generating and emitting roller skate wheel assembly of the present invention includes a wheel axle assembly carried by and beneath the roller skate blade. Such wheel axle assembly includes wheel bearings which are disposed thereon. A wheel hub is mounted on the wheel axle assembly and supported by the wheel bearings for rotational movement relative thereto. A tire, preferably made of a clear polymer is disposed about the wheel hub assembly. The roller skate wheel carries a light emitting mechanism, such as a light emitting diode, for emitting visible light preferably through the clear, polyurethane elastomer tires, as used in certain preferred embodiments. The roller skate wheel carries a light generating means which is electrically connected to the light emitting diode or other light emitting mechanism for providing electric energy and for generating light therefrom. The light generating means may include a generator, alternator magneto or other equivalent means. The details of these structures are described in greater detail hereinbelow.

DETAILED DESCRIPTION OF PREFERRED EMBODIMENTS

The structure of the Improved Light Generating and Emitting Roller Skate Wheel of the present invention incorporates a miniaturized generator within a multi-piece rollerskate or in-line skate wheel which is provided electrical energy from the rotational spin provided by the user. Each wheel contains two 1.5 v light emitting diodes (L.E.D.'s) that emit light through the clear polyurethane elastomer tire. Thus, this emitted light is defracted and illuminated throughout the diameter of the wheel. The L.E.D.'s are interchangeable, allowing the user to mix and match different colors, if desired.

The structure of the improved light generating and emitting roller skate wheel of the present invention is utilized as a potential safety feature and/or recreational toy for dusk or night rollerskating or in-line skating. The polyurethane elastomer tire is replaceable, such as for example upon becoming worn, by unscrewing the generator hub from the polyurethane elastomer tire. Thus, the structure permits the user to replace worn elastomer tires while retaining the structure of the mechanical hub intact.

As shown in the FIGS., the armatures, magnetic wire coil, and windings spool are disposed and secured within the inner walls of the generator housing. These parts are compressed between (2) ¾" O.D.×½" I.D. sealed bearings. Each bearing is pressed onto each end of the magnet hub. Because the magnet hub in certain preferred embodiments has a square hole, it interlocks with the keystock allowing the combination to be anchored to the blade portion of the skate. As the wheel begins rotational spin, all parts revolve around the anchored magnet, magnet hub and keystock. This rotational motion produces magnetic flux, thus producing the appropriate voltage necessary to illuminate the two 1.5 v L.E.D.'s.

Figure 1:
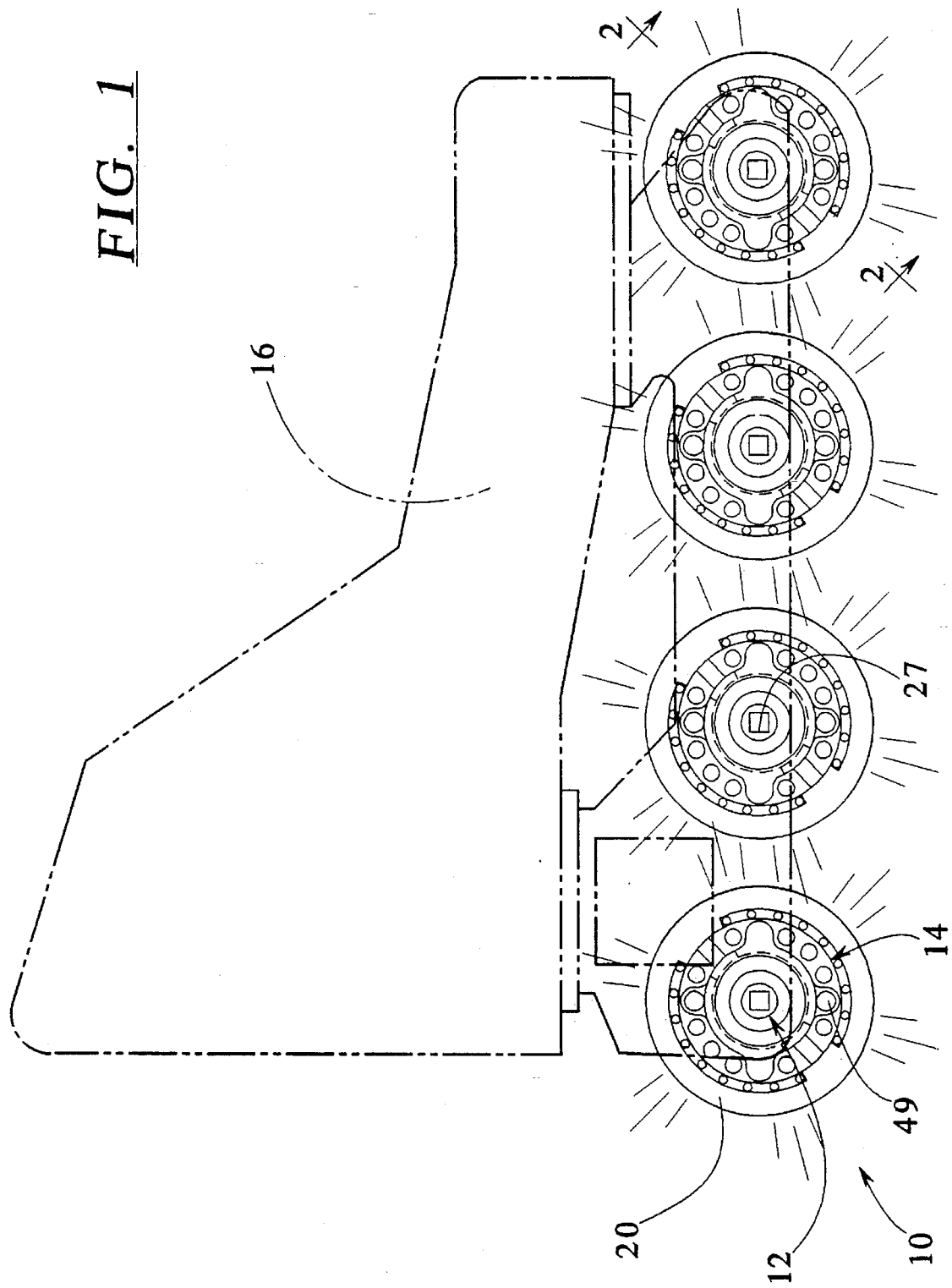
FIG. 1 is a side view of an in-line roller skate showing a side view of four in-line disposed light generating and emitting roller skate wheels of the present invention.
Figure 2:
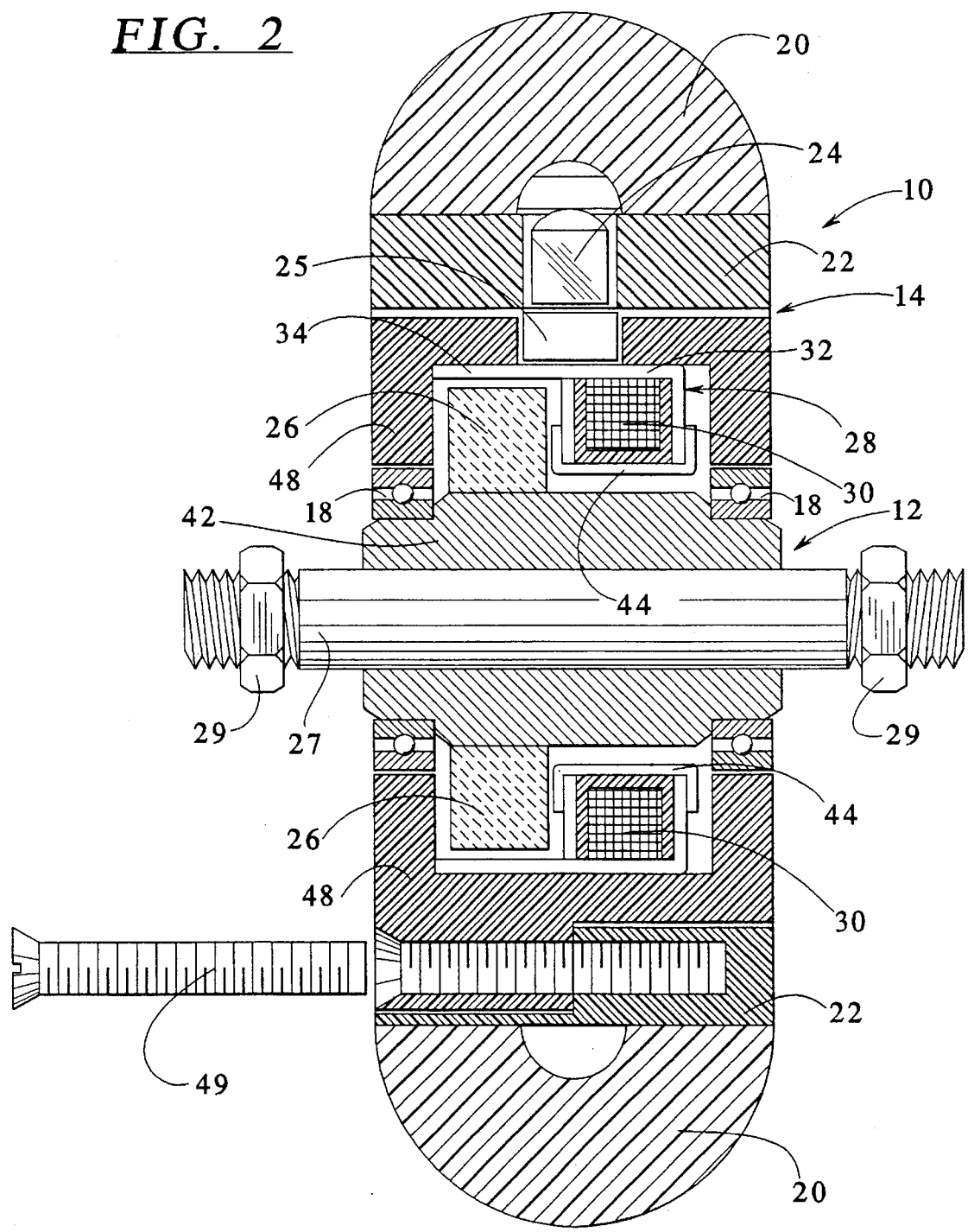
FIG. 2 is an enlarged side view taken along line 2—2 of FIG. 1 and showing the clear polymeric tire, the wheel hub assembly, and the wheel axle assembly of the present invention, including a ceramic ring magnet and an induction coil with accompanying armatures.

The improved light generating and emitting roller skate wheel of the present invention generally 10 includes as two major elements thereof a wheel axle assembly generally 12 and a wheel hub assembly generally 14. The wheel axle assembly 12 of the present invention is carried by and beneath roller skate 16. Such wheel axle assembly 12 includes wheel bearings 18 in preferred embodiments a pair of wheel bearings 18,18 disposed thereon as set forth in FIG. 2. The wheel hub assembly 14 is mounted on the wheel axle assembly 12 and supported by the wheel bearings 18,18 for rotational movement relative thereto. A tire 20 preferably formed from a polyurethane elastomer or other clear polymeric material is mounted on wheel hub 22. The roller skate wheel 10 hereof carries a light emitting generator for purposes of emitting visible light. This roller skate wheel light generating means, described in greater detail supra, is connected to a light emitting means, such as preferably a pair of 1.5 v light emitting diodes 24, as depicted in FIG. 2.

The light generating means of the present invention preferably comprises an electromagnetic current induction means, such as a generator, alternator or magento, for inducing an electrical current to be supplied to light emitting diodes 24. Light emitting diodes 24 are provided electrical contact by means of contact strips 25, which are preferably formed of copper. This electromagnet current induction generator includes a magnet 26 of, preferably of the ceramic ring variety, and which is disposed in spaced relation to an induction coil assembly generally 28, as shown on FIG. 2 magnet 26 is preferably fixedly mounted upon a magnet hub 42, which in turn is mounted upon axle 27 bearing securement lock nuts 29,29. Magnet 24 and induction coil assembly 28 are carried upon axle assembly 12 or respectively carried upon wheel hub assembly 14, for mutual relative movement. If induction coil 30 is carried upon axle assembly 12, light emitting diodes 24,24 are likewise disposed on axle assembly 12 for emitting light therefrom.

In some preferred embodiments, the light emitting diodes 24,24 are however carried upon wheel hub assembly 14 in order to direct visible light through the polyurethane elastomer tires 20 for enhanced visibility around the radial entirety of tire 20. It has been found that only two (2) 1.5 v light emitting diodes are necessary to transmit light throughout the radial entirety of tires 20, given the transmittal of light around the curvature as directed by the polyurethane elastomer material.

The induction coil assembly 28 of the present invention includes at least one armature having armature 32 and is disposed in spaced radial relationship to magnet 26. Preferably, a pair of armatures 32,36 are disposed on either side of the induction coil and respectively have long and short armature arms 34,38 each disposed in current inducing relationship with magnet 26.

Figure 3:
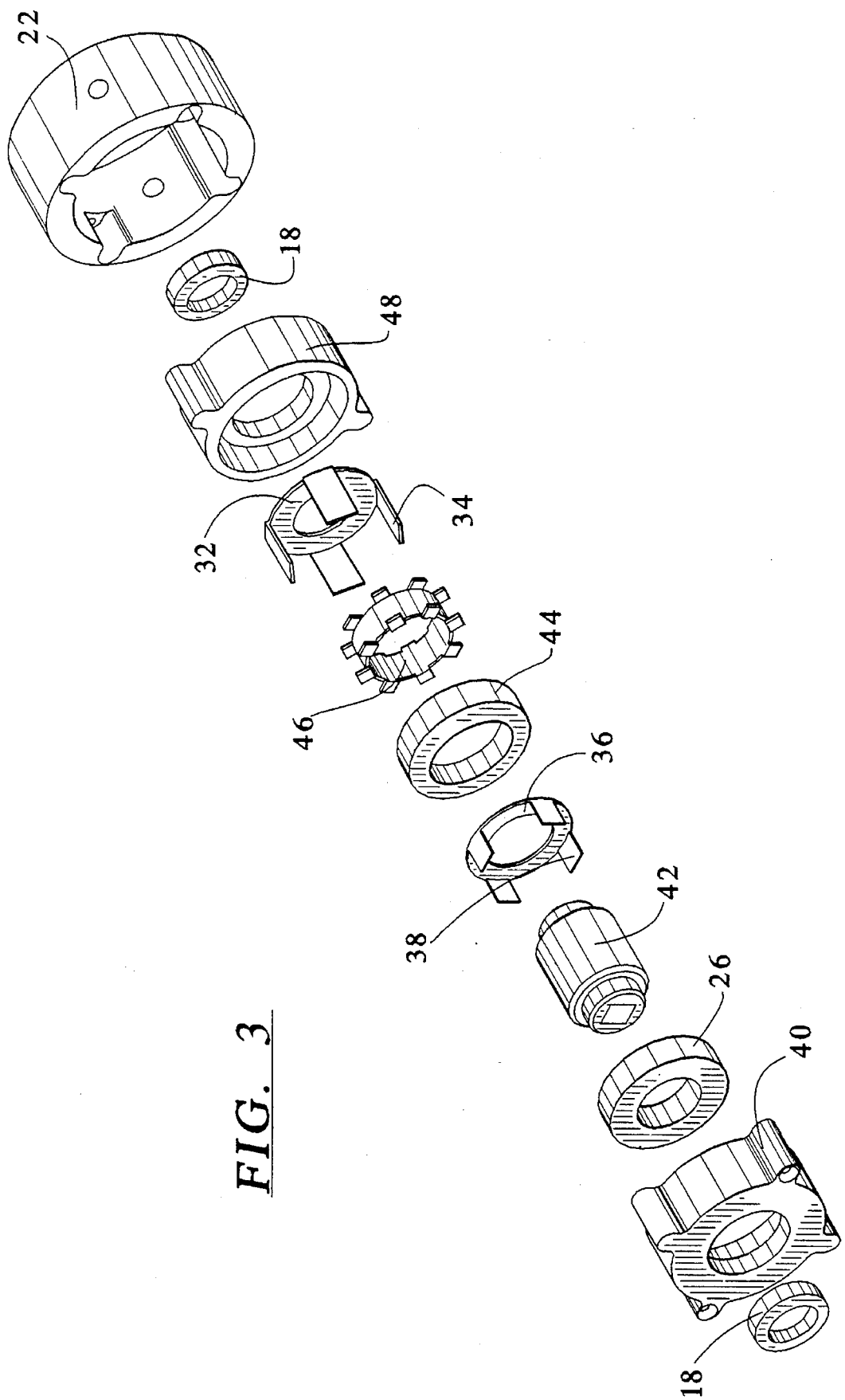
FIG. 3 is an exploded isometric view of the various major elements of the improved light generating and emitting roller skate wheel assembly of the present invention.

Referring also now to FIG. 3, which is an isometric view of the major elements of the present invention, those parts are respectively shown in exploded array as a standard seal bearing 18, such as is available from known sources in the art, a generator housing 40; a ceramic ring magnet 26, of the radial eight poll variety, grade 1; a magnet hub 42, which may be formed of CPVC molded or machined material; the short-armed armature 36, which may be preferably formed of cold rolled steel sheet metal, standard 25 gauge; a winding spool 44 for coil assembly 28, which may be preferably formed from CPVC molded or machine material; an armature spacer 46, which is preferably also formed of cold roll sheet steel metal of standard 25 gauge; a long armed armature 32 preferably formed of cold rolled sheet steel metal of standard 25 gauge; a generator housing 48, which is preferably formed of CPVC molded or machine material; another standard sealed bearing 18, and the wheel hub 22, which may be preferably formed of CPVC molded or machined material.

As shown particularly in FIG. 2 wheel hub 22 is secured to generator housing 48 by means of bolts 49.

With regard to ceramic ring magnet 26, as discussed supra, it is radially exposed around wheel axle assembly 12. At least one of armatures 32,36 includes, and preferably both armatures 32,36 include armature arms 32,36 that are radially spaced with respect to the radially disposed magnet. At least one of armature arms 34,38 includes a plurality of armature arms, and which armature arms are disposed radially and outwardly of the magnet, as shown in FIG. 2.

The induction coil assembly 28 includes a radially disposed induction coil 30 which is radially disposed about wheel axle assembly 12. Such induction coil 30 is carried radially preferably upon winding spool 46 and is disposed radially upon the exterior of wheel hub 22 for relative rotation with respect to radially disposed magnet 26, in order to induce the electrical current for powering light emitting diodes 24,24. As shown in FIG. 3 the long and short armature arms 34,38 are in preferred embodiments preferably alternatingly radially disposed about magnet 26.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. An improved light generating and emitting roller skate wheel for use upon a roller skate to enhance the visibility of a roller skater in conditions of darkness comprising:

a wheel axle assembly carried by and beneath the roller skate;

said wheel axle assembly including wheel bearings disposed thereon;

a wheel hub mounted on said wheel axle assembly and supported by said wheel bearings for rotational movement relative thereto, said wheel hub having an outer radial surface and a plurality of recessed portions with openings formed in said radial surface;

a substantially transparent tire having an inner radial surface mounted on said outer radial surface of said wheel hub, said inner radial surface having a circumferentially extending recessed portion formed therein overlying said openings formed in said radial surface of said hub;

said wheel hub carrying radially outwardly directed light emitting means within each of said recessed portions for emitting visible light through said openings formed in said radial surface of said hub and through said substantially transparent tire for permitting said light to be observed from behind and from in front of the roller skater to enhance visual detection thereof; and said roller skate wheel carrying electric generating means electrically connected to said light emitting means for providing electrical energy to said light emitting means.

2. The improved light generating and emitting roller skate wheel of claim 1 wherein said electric generating means comprises electromagnetic current induction means for inducing an electrical current to be supplied to said light emitting means.

3. The improved light generating and emitting roller skate wheel of claim 2 wherein said electromagnetic current induction means comprises a magnet disposed in spaced relation to an induction coil assembly, and wherein one of said magnet and said induction coil is carried upon said axle assembly and the other carried upon said wheel hub.

4. The improved light generating and emitting roller skate wheel of claim 3 wherein said induction coil and said light emitting means are carried upon said axle assembly.

5. The improved light generating and emitting roller skate wheel of claim 3 wherein said induction coil and said light emitting means are carried upon said hub.

6. The improved light generating and emitting roller skate wheel of claim 3 wherein said magnet comprises a ring magnet disposed around said axle assembly.

7. The improved light generating and emitting roller skate wheel of claim 3 wherein said induction coil assembly comprises at least one armature having at least one armature arm disposed in spaced outward radial relation to said magnet.

8. The improved light generating and emitting roller skate wheel of claim 7 wherein said induction coil assembly comprises a pair of armatures disposed on either side of said induction coil and respectively having long and short armature arms each disposed in current inducing relationship with said magnet.

9. The improved light generating and emitting roller skate wheel of claim 7 wherein said magnet is radially disposed around said wheel axle assembly and at least one of said armatures includes at least one armature arm radially spaced with respect to said radially disposed magnet.

10. The improved light generating and emitting roller skate wheel of claim 9 wherein said at least one armature arm comprises a plurality of armature arms.

11. The improved light generating and emitting roller skate wheel of claim 9 wherein said at least one armature arm is disposed radially outwardly of said magnet.

12. The improved light generating and emitting roller skate wheel of claim 7 wherein said induction coil assembly includes an induction coil radially disposed with respect to said wheel axle assembly.

13. The improved light generating and emitting roller skate wheel of claim 3 wherein said induction coil is carried radially upon the interior of said wheel hub for rotation therewith and for relative rotation with respect to said radially disposed magnet.

14. The improved light generating and emitting roller skate wheel of claim 8 wherein said long and short armature arms are alternatingly disposed radially about said magnet.

15. The improved light generating and emitting roller skate wheel of claim 3 wherein said magnet is a ceramic ring magnet.

* * * * *